Nov. 29, 1955 M. S. TARNOPOL 2,725,319
SAFETY GLASS HEATING PANEL
Filed Feb. 23, 1952
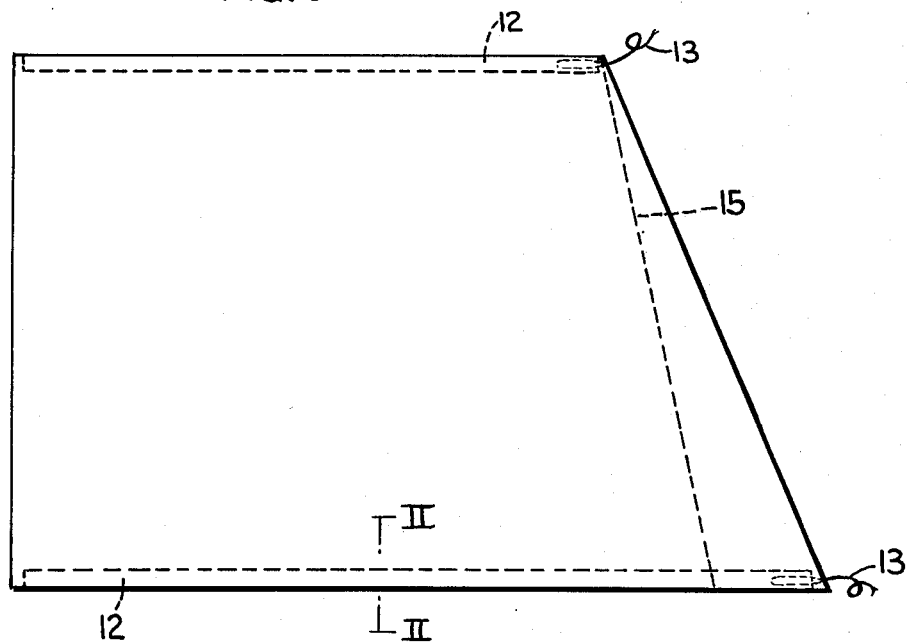
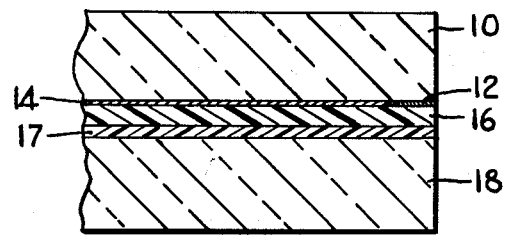
INVENTOR.
MILTON S. TARNOPOL
BY
*Oscar L. Spencer*
ATTORNEY United States Patent Office 2,725,319
Patented Nov. 29, 1955

2,725,319

SAFETY GLASS HEATING PANEL

Milton S. Tarnopol, Brackenridge, Pa., assignor to Pittsburgh Plate Glass Company, Allegheny County, Pa., a corporation of Pennsylvania Application February 23, 1952, Serial No. 273,135

5 Claims. (Cl. 154—2.73)

This invention relates to a method of applying a transparent refractory base having an electroconductive coating thereon to a sheet of a refractory material to form an adherent bond between the two and it has particular relation to an article which may be employed in such application and a method of making such article.

It is known that transparent refractory bases such as glass having a transparent electroconductive film thereon, such as a transparent electroconductive tin oxide film, are suitable for use as deicing windshields in airplanes, automobiles and like vehicles. Usually in such use they are laminated with an additional glass sheet and a plastic interlayer.

It is desired to provide a method for the installation of a refractory base having a transparent electroconductive coating thereon to windows or certain areas of windows already present in the airplane or similar vehicle. The face of the base which contains the electroconductive coating is the face which is bonded to the windshield. A number of adhesives have been tested to determine their ability to create an adherent bond between the windshield and the base containing the transparent electroconductive coating. Although a number of these adhesives form excellent bonds when tested with flat glass, the bus bars and leads thereto on the face of the base containing an electroconductive coating make it difficult to obtain uniform contact between the windshield and the base containing the electroconductive coating and bus bars. It is necessary to fill large voids with the adhesive and it is difficult to get good clarity. In addition, despite masking, it is extremely difficult to clean the excess adhesive after curing from the edges of the base containing the coating without chipping the base or causing adhesive failure.

In accordance with the present invention a method of applying a transparent refractory base having a transparent electroconductive coating on the face thereof to a sheet of refractory material to form an adherent bond therebetween has been discovered. This method comprises laminating a sheet of plastic, for example, a polyvinyl acetal such as polyvinyl butyral, to the face of the base containing the electroconductive coating and bus bars, applying a coating of a plasticizer such as dibutyl phthalate to the area of the refractory material to which the laminated base is to be applied, assembling the laminated base on the refractory material so that the plastic comes into face to face contact with the area containing the plasticizer and applying heat and pressure to the assembly.

An outstanding feature of the articles disclosed herein is the ease by which they can be converted into an electroconductive safety glass assembly provided with an intermediate layer of plastic sandwiched between two sheets of glass. One of the sheets of glass of this assembly is provided with a pair of spaced bus bars and a transparent electroconductive coating in electrical contact with the bus bars and on a surface engaging the plastic interlayer. This assembling may be accomplished comparatively easily in a retail field establishment, and does not require any complicated machinery such as an autoclaving unit previously considered necessary to form a finished product.

In accordance with the present invention, a manufacturer of safety glass need not complete its manufacture at his plant. Instead, the components comprising a safety glass assembly may be shipped individually or in a single package for final assembly at the time of sale to an ultimate consumer or immediately prior to its installation. Should an individual component comprising the safety glass construction be damaged in transit to the retail establishment, there is no need to scrap an entire, expensive, laminated assembly. Furthermore, in accordance with my invention, no heavy capital equipment is required at the retail level to complete the assembly of a transparent electroconductive laminated structure.

A description of the article used in the practice of the invention and a method of producing this article are described below in conjunction with the accompanying drawing in which:

Fig. 1 is a plan view drawn to scale illustrating a laminated article suitable for use in the practice of the invention and Fig. 2 is a cross sectional view greatly enlarged of Fig. 1 taken along lines II—II of Fig. 1.

The article illustrated in Fig. 1 and Fig. 2 comprises a glass sheet 10 of substantially rectangular shape (one edge not being perpendicular to its adjacent edges) having bus bars, or conductive edge strips 12 of an electroconductive metal such as silver, gold, etc. along opposing parallel edges and close to the edges of the glass sheet, preferably within 0.2 inch of the edge and approximately ⅛ to 1 inch in width. The bus bars are connected to a source of power (not shown) by means of leads 13 of copper or other suitable material. Substantially the entire surface area of the sheet 10 is provided with a transparent electroconductive film 14 of tin oxide or other suitable material.

A portion of the glass 10 does not contain the electroconductive film 14. This is the area just in from the right hand edge of the sheet, which edge does not form a perpendicular line between the parallel edges containing the bus bars. The portion of the sheet 10 not containing the electroconductive film 14 is in the form of a triangle having its base along the lower longer parallel edge and its apex at the end of the upper shorter parallel edge with one side being the edge of the base and the other the boundary line 15 between the film 14 and the non-coated portion.

A sheet of plastic 16 having substantially the same contour as the glass 10 is laminated to the glass on the face of the glass containing the transparent electroconductive film 14 and bus bars 12. This is done by laying the sheet of plastic on the above described face containing the electroconductive coating and bus bars, placing a thin sheet of a flexible, smooth faced, non-adherent material 17 such as cellulose acetate or regenerated cellulose (cellophane) on top of and completely covering the plastic and then placing a rigid, smooth surfaced sheet of material 18, for example, a refractory material such as polished plate glass, on top of and in face to face contact with the non-adherent material 17.

This assembly is then wrapped in cellophane and heavy wrapping paper, placed in an evacuated rubber bag which is in turn placed in a autoclave and subjected to high temperatures and hydraulic pressures in order to bring the plastic 16 into intimate and adherent contact with the electroconductive film 14 and bus bars 12. The use of the thin sheet of smooth faced, flexible, non-adherent cellulose acetate 17 prevents the surface of the plastic with which it is in contact from adhering to the glass 18 during the lamination. The polished plate glass 18 is employed to impart a smooth surface to the surface of the plastic adjacent the cellulose acetate which is sometimes referred to as a "press polished" surface. The provision of the plastic 16 with a smooth surface is extremely important and necessary in order to produce a firm and lasting bond between the plastic and the glass of the windshield to which it is to be attached.

The assembly as described above is removed from the rubber bag after lamination and shipped to the place where the heating panel is to be installed. Upon arrival, the glass 18 and non-adherent layer 17 are removed from the plastic and the laminated portion is ready for application to the windshield. It is necessary that the non-adherent layers 17 and glass 18 be maintained in place until the heating panel is to be installed, in order to protect the plastic from moisture, scratches, fingerprints, etc., which would materially decrease the ability of the plastic to form a clear adherent bond with the windshield.

The windshield or other refractory base is thoroughly cleaned and a plasticizer such as dibutyl phthalate, triglycol dihexoate or tri-ethyl phosphate is applied to the area of the glass to which the plastic is to be adhered. The laminated structure composed of the refractory base 10 having the electroconductive coating 14 and bus bars 12 thereon and laminated to the plastic 16 is then placed on the coated area of the windshield with the plastic placed in contact with the plasticizer and an adherent bond is formed by applying heat and pressure to the assembly.

The assembly is placed in a bag formed of transparent plastic which is preferably heat sealable to facilitate fabrication and closure. Polyethylene, regenerated cellulose and polyvinylidene chloride are examples of suitable materials. By means of a conventional vacuum pump, air is removed from the interior of the bag and a vacuum of about 25 millimeters of mercury is maintained therein. During evacuation the assembly may be viewed through the transparent bag and minor adjustments thereto are possible. It will be readily apparent that the use of atmospheric pressure in this way assures a uniform application of pressure over the panel undergoing attachment.

After attaining the desired degree of vacuum and effecting any necessary adjustment between the component elements, heat is applied to the assembly in order to soften the plastic interlayer 16 and cause adhesion to the windshield. As the assembly is in a transparent bag, radiant energy is a most convenient source of the necessary heat and it has been found that two 250 watt heat lamps positioned a distance of 28 inches from the assembly for a period of about eight hours will serve satisfactorily. Other types of infrared heating could be utilized if desired and the period of exposure would vary with the type of heating element and its position with respect to the assembly.

The bond as formed by the process described above has met satisfactorily the high standards set by the laminated glass industry. This bond has been subjected to high humidities, exposure to temperatures of from 0° F. to 240° F., ultra-violet, visible, and infrared radiation and break tests, without development of delamination, separation, discoloration or other defect.

Although the present invention has been described with particular reference to the specific details of certain embodiments thereof, it is not intended that such details shall be regarded as limitations upon the scope of the invention except insofar as included in the accompanying claims.

I claim:
1. An article of manufacture, for subsequent attachment to a transparent refractory sheet, which consists of a refractory base having a transparent electroconductive coating and a pair of laterally spaced bus bars on a face thereof and a sheet of plastic laminated to the base on the face of the base containing the transparent electroconductive coating and bus bars, the exposed face of the plastic having a press polished surface.

2. An article of manufacture, for subsequent attachment to a transparent refractory sheet, which consists of a refractory base having a transparent electroconductive coating and a pair of laterally spaced bus bars on a face thereof and a sheet of a polyvinyl acetal laminated to the base on the face of the base containing the transparent electroconductive coating and bus bars, the exposed face of the polyvinyl acetal having a press polished surface.

3. An article of manufacture, for subsequent attachment to a transparent refractory sheet, which consists of a glass base having a transparent electroconductive coating and a pair of laterally spaced bus bars on a face thereof and a sheet of polyvinyl butyral laminated to the base on the face of the base containing the transparent electroconductive coating and bus bars, the exposed face of the polyvinyl butyral having a press polished surface.

4. An article of manufacture, for subsequent attachment to a transparent refractory sheet, which consists of a refractory base having a transparent electroconductive coating and a pair of laterally spaced bus bars on a face thereof, a sheet of plastic laminated to the base on the face of the base containing the transparent electroconductive coating and bus bars, a thin sheet of flexible, smooth faced, non-adherent material on top of and completely covering the plastic and a sheet of a rigid smooth surfaced material in face to face contact with and covering the non-adherent material.

5. An article of manufacture, for subsequent attachment to a transparent refractory sheet, which consists of a glass base having a transparent electroconductive tin oxide coating and a pair of laterally spaced bus bars on a face thereof, a sheet of polyvinyl butyral laminated to the glass on the face of the glass containing the transparent electroconductive coating and bus bars, a thin sheet of flexible, smooth faced, non-adherent material on top of and completely covering the polyvinyl butyral and a sheet of polished plate glass in face to face contact with and covering the non-adherent material.

References Cited in the file of this patent

UNITED STATES PATENTS

| | | |
|---|---|---|
| 2,106,766 | Sherts | Feb. 1, 1938 |
| 2,299,827 | Koester | Oct. 27, 1942 |
| 2,303,151 | Watkins | Nov. 24, 1942 |
| 2,464,540 | Williams | Mar. 15, 1949 |
| 2,466,078 | Boicey | Apr. 5, 1949 |
| 2,470,509 | Marini | May 17, 1949 |
| 2,507,036 | McCrumm | May 9, 1950 |
| 2,557,983 | Linder | June 26, 1951 |
| 2,614,944 | Lytle | Oct. 21, 1952 |
| 2,640,904 | Gaiser | June 2, 1953 |

OTHER REFERENCES

Vinylite, Bakelite Div. of U. C. C. cpw. 1949, p. 40, Table IX, line 16.

Vinylite, Bakelite Division Union Carbide and Carbon Corp. Public, Revised August 1950, p. 4, paragraph 1.